June 12, 1945.  L. GLASS  2,377,933
COMPOSITE FABRIC
Filed July 31, 1941
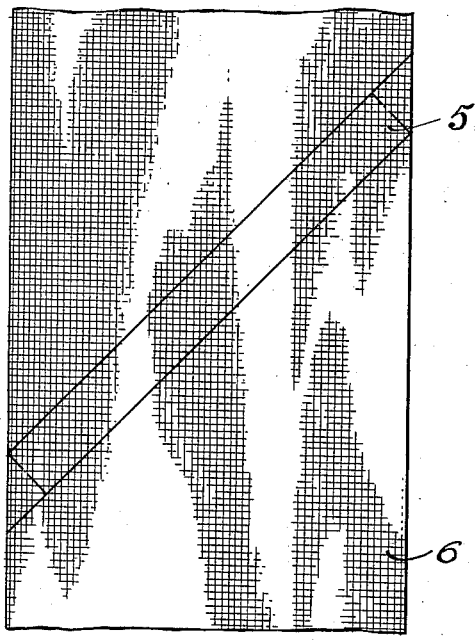
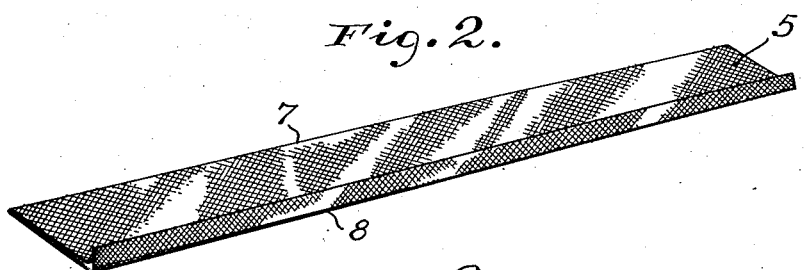
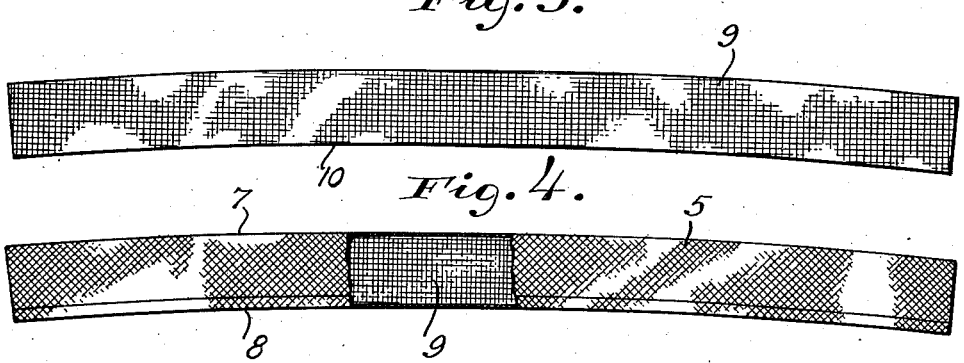
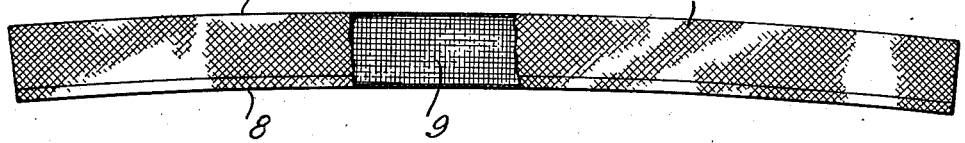
INVENTOR.
LOUIS GLASS
BY
ATTORNEYS Patented June 12, 1945

2,377,933

UNITED STATES PATENT OFFICE 2,377,933

COMPOSITE FABRIC

Louis Glass, Kew Gardens, N. Y., assignor to Celanese Corporation of America, a corporation of Delaware Application July 31, 1941, Serial No. 404,863

10 Claims. (Cl. 154—2)

This invention relates to the preparation of laminated, stiffened fabrics and to wearing apparel or other technical or commercial articles formed in whole or in part from such stiffened fabrics, and relates more particularly to such articles of laminated, stiffened fabrics wherein at least one of the layers of fabric is made of or contains a thermoplastic material.

An object of my invention is the preparation of stiffened, laminated fabrics of predetermined shape in an efficient and economic manner.

Another object of my invention is the preparation of shaped, stiffened laminated fabrics which possess appreciable elasticity.

Still another object of my invention is the preparation of shaped, stiffened laminated fabrics which may be employed as sweat-bands for hats.

Other objects of my invention will appear from the following detailed description and the accompanying drawing.

In the drawing, wherein like reference numerals refer to the same or similar elements in the several views;

Fig. 1 is a view of a fabric showing a section or strip cut therefrom on the bias, Fig. 2 is a perspective view of the strip of bias-cut fabric shown in Fig. 1 folded to form a flat, envelope-like structure, Fig. 3 is a detail view showing a piece of stiffening fabric cut to a curved shape adapted to be inserted in the envelope-like structure shown in Fig. 2, and Fig. 4 is a detail view, partly broken away to show the inner layer, of a stiffened, curved, laminated fabric formed in accordance with my invention by uniting the fabrics shown in Figs. 2 and 3.

In the preparation of stiffened, laminated fabrics by causing cellulose acetate or other organic derivative of cellulose to melt or coalesce by operations involving the use of heat and pressure, many attempts have been made to obtain stiffened fabrics in a predetermined curved shape which fabrics, though stiffened, would still possess an appreciable amount of elasticity. Some of these attempts have involved cutting or folding a plurality of fabric layers to the desired curved shape, at least one of which fabric layers is made of or contains an organic derivative of cellulose, assembling said cut or folded fabrics in the desired sequence and then causing the fabric layers to be joined by the use of adhesives or solvents or by the application of heat and pressure or by the combined use of adhesives or solvents with heat and pressure. While stiffened fabrics of the desired shape may be obtained in this manner, it had been found essential to have the several plies or layers all of the same shape in order for the final product to be shaped as desired. Where the fabrics were cut to shape, this involved the use of patterns and presented the problem of obtaining the maximum number of shaped pieces from a given yardage. Where, however, the outer plies or layers were to be folded to a particular curved shape, this involved the use of complicated guides and intricate folding machinery. In addition to the necessity for using such complex machinery, the stiffened, laminated fabrics produced in this manner were noticeably lacking in elasticity and were, therefore, not entirely suitable for uses such as, for example, belts, suspenders, sweat-bands for hats, or garters where a stiffened fabric with a decided elasticity or "give" is desired.

I have now discovered that stiffened, laminated fabrics of predetermined curved shape and possessing an unusual degree of elasticity may be prepared from a plurality of fabric layers, at least one of which is made of or contains a thermoplastic material in the form of filamentary materials such as yarns, filaments or fibers or in the form of a coating on a fabric or in the form of a powder applied to a fabric or fabrics before the laminating step, without the necessity for folding or otherwise shaping the outer layers of fabric to the shape desired in the final stiffened assembly.

In accordance with my process, a fabric is cut on the bias and is then folded along its long edges to form a flat, rectangular envelope-like structure having parallel sides. Within the folds of this envelope-like structure is positioned a layer of fabric of substantially the same length as said envelope-like structure and having the curved shape desired in the final product, causing the edges of the envelope-like structure to assume the curvature of the inner layer. Heat and pressure are then applied to the laminae causing the same to unite and set the laminated structure in the configuration of the inner layer. Thus, while the outer bias-cut fabric may originally be folded along a straight line, by inserting an inner layer of fabric having a curved shape into the folds of the bias-cut fabric the latter adjusts itself to the shape of the inner fabric and upon treatment of the assembled fabrics under heat and pressure there results a laminated product having the same curved shape as the inner layer. As a result of my discovery, the preparation of shaped, laminated fabrics may now be greatly simplified since the outer fabrics may now be folded along a straight line by the use of simple guides and pressing means, such as calender rolls, and the need for complicated machinery to fold the outer fabric along a curve so that the final stiffened fabric will be curved is thus wholly eliminated.

The laminated fabric of my invention is eminently suitable for use in the manufacture of belts, suspenders, sweat-bands for hats, garters and, in fact, in all articles where some elasticity in the stiffened fabric is desirable or necessary.

Laminated fabrics of any degree of stiffness may be obtained depending upon the nature of the fabrics employed and the manner in which they are laminated. Preferably, I employ an outer fabric which is made in whole or in part of yarns of a thermoplastic material such as cellulose acetate or other organic derivative of cellulose, and unite said fabric with a shaped inner layer which contains a plasticizer for the thermoplastic material contained in the outer fabric. The shaped inner layer containing the plasticizer may itself be made of or contain yarns of a thermoplastic material or it may be made of yarns of a non-thermoplastic material such as, for example, cotton, regenerated cellulose, linen, wool or natural silk. Where the inner layer is made wholly of yarns of a non-thermoplastic material it may be coated or otherwise treated so as to have incorporated or associated therewith a thermoplastic material. By employing an inner layer containing a plasticizer for the thermoplastic yarns of the outer layers and avoiding the use of a plasticizer in the outer layer of fabrics, the original fabric structure and the original appearance of the outer or exposed layers may be maintained and coalescence of the filaments or yarns thereof avoided upon the subsequent application of heat and pressure to unite the several layers. If desired, the outer, bias-cut fabric may likewise be made of yarns of non-thermoplastic materials and may be laminated by employing a shaped inner layer made of or containing thermoplastic material or an inner layer of non-thermoplastic yarns which is coated or has otherwise associated therewith a thermoplastic material, as heretofore described.

Where the outer fabric or inner layer is only in part composed of yarns of a thermoplastic material, such as cellulose acetate, the yarns may alternate either in the warp or in the weft or both, in any desired degree of alternation with yarns of non-thermoplastic materials. This alternation may be, for example, 1, 2, 3 or more cellulose acetate yarns with 1, 2, 3 or more yarns of cotton or other non-thermoplastic material. Conveniently, the warp may be made with such alternations of cellulose acetate yarn and yarns of other materials, while the weft may consist wholly of cellulose acetate yarn or wholly of yarns of non-thermoplastic materials. If desired, a fabric may be employed in which either the warp or weft consists wholly of cellulose acetate yarn while the other component consists of non-thermoplastic yarn. The fabrics may also be composed of yarns spun from mixed fibers wherein some of the fibers are of a thermoplastic material while the remainder are of non-thermoplastic materials.

The fabrics, after being assembled by interposing the plasticized inner layer between the folds of the outer fabric, may then be united by the application of heat and pressure. This may be done by any suitable device, for instance, by hot ironing or by passing between pressure rolls one or both of which are heated, or between a heated roller and a heated or cold plate or surface, or between a heated pressing iron or plate and a cold board or surface. Preferably I employ a pressing device comprising two flat heated surfaces one of which is padded so as to be slightly yielding. The heating device may be heated to the desired temperatures, for example, 80° C. to 180° C. or more by any suitable heating medium and the pressure applied may be any desired pressure, say, from 10 to 600 pounds per square inch. In some instances it is desirable that water be present during the application of heat and pressure. The water may be applied in any suitable manner as by dipping, spraying, brushing or padding the assembled fabrics. After the fabric assembly has thus been wetted, heat and pressure may then be applied.

In employing my invention, the layers of the composite fabric may be joined together and the assembly stiffened without a visible alternation of the exposed layers of fabric that contain organic derivatives of cellulose. While the plasticizer which has been incorporated in or applied to the backing or inner layers of fabric of the composited article in any suitable manner is sufficient to cause a flow or softening of the organic derivatives of cellulose on the inner sides of the outer layers of the fabric, the action is not carried through the exposed layer of fabric to the outer surface thereof to alter the appearance or hand of the exposed part. Thus, the texture and hand of the exposed surface or surfaces of the composite fabric will be unaltered and may be the same as an unstiffened and/or unadhering fabric layer.

My invention will now be described with reference to the accompanying drawing. Thus, in carrying out the process of my invention, a strip or section 5 is cut from a fabric 6 on the bias, i. e. on a diagonal line across the width of the fabric. Preferably, the cut is made at an angle of about 45°. The strip 5 is then folded along straight lines 7 and 8 which are parallel to the cut edges and in this manner there is formed a flat, envelope-like, rectangular structure which is to comprise the outer or covering fabric of the final stiffened assembly. The inner layer of fabric by means of which said fabric layers are united is indicated by reference numeral 9, and, as shown in Fig. 3, said inner layer is cut along a curve conforming to the shape desired in the final stiffened assembly. This curved strip 9, which has incorporated therewith a plasticizer for the particular organic derivative of cellulose or other thermoplastic material being employed in the outer fabric layers or contains the thermoplastic or adhesive material in the form of a coating or powder, is inserted between the folds of the strip 5, and the outer fabric which has been folded along straight lines to form an envelope-like, rectangular structure adjusts itself to the curvature of the inner fabric. The entire assembly is then subjected to the action of heat and pressure or is otherwise united, and, after the entire assembly has been united, the final product is a stiffened, curved band as shown in Fig. 4. The outer fabric 5 has become firmly united with the inner liner 9 but the appearance of the exposed outer fabric remains unchanged. The resulting product possesses an unusual elasticity and, at the same time, has a firm, stiffened hand and appearance. Strip 9 may be inserted in the folds of strip 5 in such a manner that the concave or lower curved edge 10 thereof lies along the line 8 of folded strip 5 adjacent to the short flap thereof, as is shown in Fig. 4; or, on the other hand, strip 9 and folded strip 5 may be so assembled that concave edge 10 lies adjacent to line 7 in the assembled fabrics and away from the short flap of the folded, envelope-like structure. The manner in which the several fabrics are assembled may thus be varied in accordance with the purpose for and manner in which the final product is to be employed.

Any suitable plasticizer may be employed in the inner layer, which plasticizer may or may not be soluble in water. The plasticizers may be any of the high-boiling solvents or softening agents as, for example, the aryl sulphonamides such as para-ethyl-toluene sulphonamide, the alkyl phthalates such as dimethyl phthalate, the dialkyl tartrates such as dibutyl tartrate, the alkoxy esters of polybasic organic acids such as diethoxy-ethyl-phthalate, the polybasic acid esters of the mono alkyl ethers of polyhydric alcohols such as diethylene-glycol ethyl-ether ester of phthalic acid, the alkyl esters of phosphoric acid such as triethylglycol phosphate, the mixed alkyl and aryl phosphates, and camphor.

The amount of plasticizer present is preferably relatively large and on the order of from less than 40% to 150% or more of the weight of the organic derivative of cellulose present in the assembly of fabrics. Where the assembly is to consist of fabrics of an organic derivative of cellulose as the front and back layers and an inner layer of a cotton fabric, the amount of plasticizer applied to the cotton fabric may be as much as the cotton fabric will absorb and retain, i. e. the cotton fabric is saturated with the plasticizer.

The yarns or filaments employed to form the fabric, the coating on the fabric or the powder may be made of any suitable organic derivative of cellulose, for instance, organic esters of cellulose and cellulose ethers. Examples of organic esters of cellulose are cellulose acetate, cellulose propionate, cellulose butyrate, mixed esters such as cellulose acetate-propionate, and cellulose acetate-butyrate, while examples of cellulose ethers are ethyl cellulose and benzyl cellulose. Moreover, the organic derivative of cellulose thermoplastic material may be replaced in whole or in part by a suitable thermoplastic resin or by any other suitable adhesive material.

It is to be understood that the foregoing detailed description is merely given by way of illustration and that many variations may be made therein without departing from the spirit of my invention.

Having described my invention, what I desire to secure by Letters Patent is:

1. Process for the production of laminated fabric having a curved shape and elastic characteristics, which comprises adhesively uniting a fabric of predetermined curved shape to the inner surfaces of a folded, bias-cut fabric envelope of substantially rectangular shape, the resulting laminated fabric assuming the shape of the first-mentioned fabric.

2. Process for the production of laminated fabric having a curved shape and elastic characteristics, which comprises uniting under the action of heat and pressure a fabric of predetermined curved shape to the inner surfaces of a folded, bias-cut fabric envelope of substantially rectangular shape, at least one of said fabrics containing a thermoplastic material having a basis of an organic derivative of cellulose and at least one of said fabrics having incorporated therewith a plasticizer for said organic derivative of cellulose, the resulting laminated fabric assuming the shape of the first-mentioned fabric.

3. Process for the production of laminated fabric having a curved shape and elastic characteristics, which comprises uniting under the action of heat and pressure a fabric of predetermined curved shape to the inner surfaces of a folded, bias-cut fabric envelope of substantially rectangular shape, at least one of said fabrics comprising filaments or yarns having a basis of cellulose acetate and at least one of said fabrics having incorporated therewith a plasticizer for said cellulose acetate, the resulting laminated fabric assuming the shape of the first-mentioned fabric.

4. Process for the production of laminated fabric having a curved shape and elastic characteristics from a plurality of fabrics, which comprises uniting under the action of heat and pressure a fabric of predetermined curved shape containing a thermoplastic material having a basis of an organic derivative of cellulose and having incorporated therewith a plasticizer for said organic derivative of cellulose, to the inner surfaces of a folded, bias-cut fabric envelope of substantially rectangular shape made of yarns of an organic derivative of cellulose, the resulting laminated fabric assuming the shape of the first-mentioned fabric.

5. Process for the production of laminated fabric having a curved shape and elastic characteristics from a plurality of fabrics, which comprises uniting under the action of heat and pressure a fabric of predetermined curved shape, said fabric comprising filaments or yarns having a basis of cellulose acetate and having incorporated therewith a plasticizer for said cellulose acetate, to the inner surfaces of a folded, bias-cut fabric envelope of substantially rectangular shape made of yarns of cellulose acetate, the resulting laminated fabric assuming the shape of the first-mentioned fabric.

6. A shaped, laminated product comprising a piece of fabric having at least one curved longitudinal edge adhesively joined to the inner surface of a folded, bias-cut fabric envelope of substantially rectangular shape, the laminated product being of substantially the same shape as the first-mentioned fabric.

7. A shaped, laminated product comprising a piece of fabric having at least one curved longitudinal edge, containing a thermoplastic material having a basis of an organic derivative of cellulose and having incorporated therewith a plasticizer for said organic derivative of cellulose, joined to the inner surface of a folded, bias-cut fabric envelope of substantially rectangular shape, the laminated product being of substantially the same shape as the first-mentioned fabric.

8. A shaped, laminated product comprising a piece of fabric having at least one curved longitudinal edge, containing a thermoplastic material having a basis of cellulose acetate and having incorporated therewith a plasticizer for said cellulose acetate, joined to the inner surface of a folded, bias-cut fabric envelope of substantially rectangular shape, the laminated product being of substantially the same shape as the first-mentioned fabric.

9. A sweat-band for a hat comprising a piece of fabric having curved longitudinal edges, containing a thermoplastic material having a basis of an organic derivative of cellulose and having incorporated therewith a plasticizer for said organic derivative of cellulose, laminated to the inner surface of a folded, bias-cut fabric envelope of substantially rectangular shape, the laminated product being of substantially the same shape as the first-mentioned fabric.

10. A sweat-band for a hat comprising a piece of fabric having curved longitudinal edges, containing a thermoplastic material having a basis of cellulose acetate and having incorporated therewith a plasticizer for said cellulose acetate, laminated to the inner surface of a folded, bias-cut fabric envelope of substantially rectangular shape, the laminated product being of substantially the same shape as the first-mentioned fabric.

LOUIS GLASS.